United States Patent Office 3,608,448
Patented Sept. 28, 1971

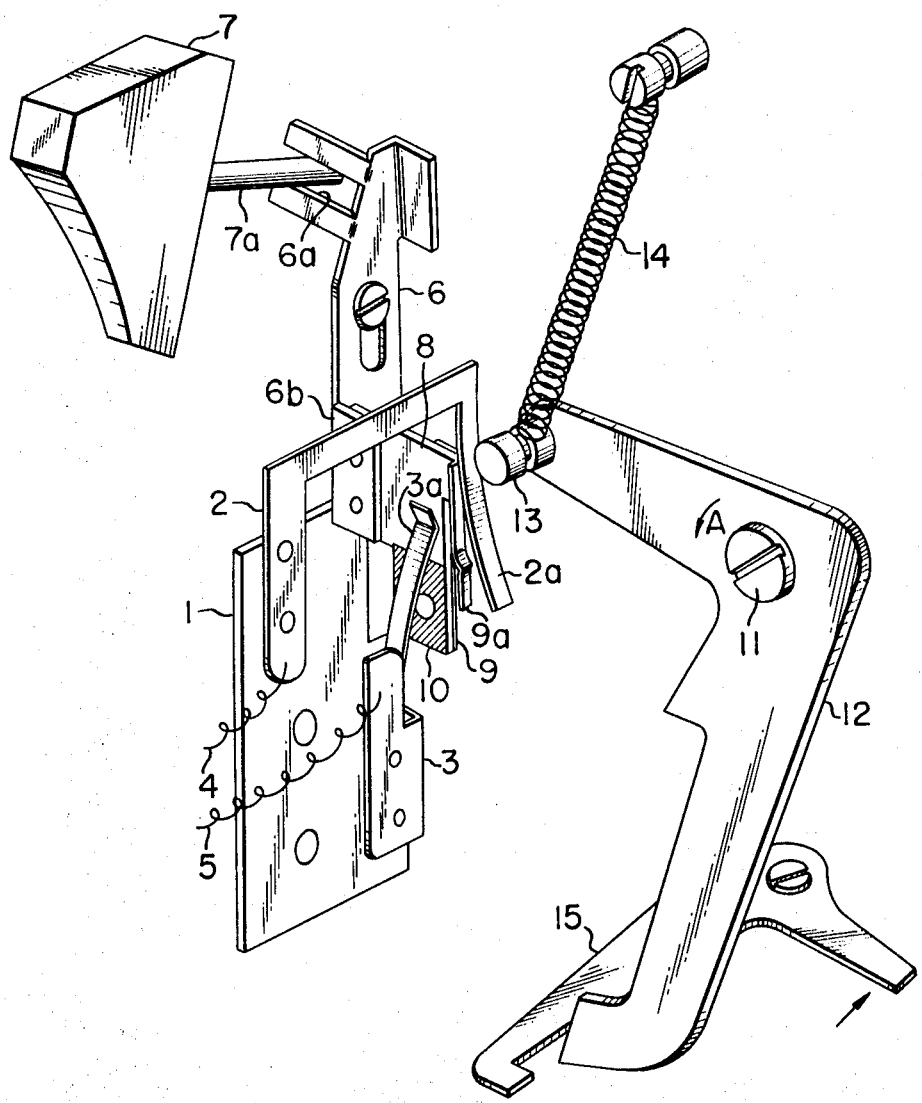

3,608,448
EXPOSURE METER SWITCH FOR CAMERA
Tadayuki Imai, Tokyo, Japan, assignor to
Kabushiki Kaisha Ricoh, Tokyo, Japan
Filed Feb. 26, 1970, Ser. No. 14,287
Claims priority, application Japan, Feb. 27, 1969,
44/17,527
Int. Cl. G03b *17/00*
U.S. Cl. 95—10C                                    2 Claims

ABSTRACT OF THE DISCLOSURE

An exposure meter switch for cameras wherein a first switch which is opened or closed in response to the actuation of a selection member for selecting either an automatic exposure setting or a manual exposure setting and a second switch which is closed in response to the film winding and is automatically opened in response to the shutter release operation are connected in series to a circuit of an exposure meter.

BACKGROUND OF THE INVENTION

The present invention relates to an exposure meter for single-lens reflex cameras and more particularly a switch for exposure meters.

In the conventional single-lens reflex camera, the power source circuit of an exposure meter is closed by a selection knob which selects either an automatic exposure setting or a manual exposure setting simultaneously when a diaphragm or stop is reduced and the power source circuit is automatically opened by the selection knob which in turn is automatically returned to its normal position in response to the shutter release operation. Alternatively, the power source circuit is closed in response to the stopping down upon film winding by an external selection knob and is automatically opened by the selection knob which in turn is automatically returned to its normal position in response to the shutter release operation. In the former system, there is a disadvantage that the selection knob must be set everytime when the film is wound, and in both systems described above the selection knobs displace themselves everytime when the shutter is released, so that when an operator touches the selection knobs, the movement of the reflecting mirrors cameras are interrupted.

SUMMARY OF THE INVENTION

The present invention relates to an exposure meter switch for cameras in which a first switch which is opened or closed in response to the actuating of an external selection member for selecting either of an automatic exposure setting or a manual exposure setting and a second switch which is closed in response to the film winding and is automatically opened in response to the shutter release operation are connected in series to a circuit of an exposure meter.

The exposure meter switch of the present invntion has a very simplified construction yet with many advantages. When the selection member is set to a power source circuit closing position, the exposure meter circuit is closed in response to the film winding and is opened when the shutter button is released even when the selection member is set to the above described position. Therefore, the waste of the battery may be advantageously prevented; the external selection member may be set irrespectively of the actuation of the mechanisms within the camera; and the shock or impact caused by the actuation of a reflecting mirror retracting member may be advantageously absorbed.

The above and other objects, features and advantages of the present invention will become more apparent from the description of one illustrative embodiment thereof taken in conjunction with the accompanying drawing.

BRIEF DESCRIPTION OF THE DRAWING

Single figure is a fragmentary perspective view of an exposure meter switch in accordance with the present invention illustrating only the essential parts thereof.

DESCRIPTION OF THE PREFERRED EMBODIMENT

The present invention will be described as being applied to a single-lens reflex camera. To an insulating base 1 securely fixed to a stationary member of a camera are fixed the bases of a first and second contact elements 2 and 3 which in turn are electrically coupled to an exposure meter power source (not shown) through lead wires 4 and 5 respectively. A sliding member 6 is fixed to the camera body vertically slidably and within a bifurcated portion 6a formed at one end of the sliding member 6 is fitted a shaft 7a of a selection knob 7 which selects either an automatic exposure setting position or a manual exposure setting position. It is, therefore, seen that the sliding member 6 may be vertically displaced upon operation of the selection knob 7 so that an aperture or stop of a photo lens is set by a well known aperture or stop setting mechanism, thereby varying a quantity of light passing through the lens and being intercepted by an exposure meter. A movable insulating element 8 is fixed to an upstanding portion 6b of the sliding member 6 and the base of a third contact element 9 and a conductive member 10 which is electrically coupled to the third element 9 are fixed to both sides of the movable insulating element 8 in such a manner that a curved free end 2a of the first contact element 2 may be opposed to the free end 9a of the third contact element 9 with a suitable spacing therebetween. Subsequently, upon the vertical movement of the sliding member 6, the free end 3a of the second contact element 3 is caused to contact with either of the conductive member 10 or the movable insulating element 8. Thus, a first switch assembly is constituted by the second element 3 and the conductive member 10 while a second switch assembly, by the first contact element 2 and the third contact element 9. Both of the first and second switch assemblies are coupled in series to the circuit of the exposure meter in such a manner that the exposure meter is actuated only when both of the switches are closed simultaneously.

A lever 12 which is drivingly coupled to a reflecting mirror retracting member (not shown) is pivotably fixed by means of a pin 11. A spring 14 is loaded between a pin 13 projecting from one end of the lever 12 and the stationary member of the camera body. The other end of the lever 12 is engaged with an energy storing member 15 which in turn is actuated when the film is wound. Therefore, upon winding of the film, the lever 12 is caused to rotate in the direction indicated by the arrow A against the spring 14, thereby pressing the free end 2a of the first contact element 2 against the free end 9a of the third contact element 19.

In the figure, the selection knob 7 is set to the lower position and the parts are shown as being in the positions prior to the film winding. More particularly, the pin 13 is moved away from the free end 2a of the first contact element 2 while the first and third contact elements 2 and 9 are spaced apart from each other thereby opening the second switch. The free end 3a of the second contact element 3 is in contact with the movable insulating element 8 so that the first switch is also opened. When the film is wound, the member 15 causes the lever 12 to rotate in the counterclockwise direction so that the pin 13 slides over the first contact element 2 toward its free end 2a, thereby pressing the latter against the free end 9a of the third contact member 9 whereby the second switch is closed while the first switch remains opened. The exposure meter is therefore deactivated.

When the sliding member 6 is caused to move upwardly by the selection knob 7, the free end 3a of the second contact element 3 is made in contact with the conductive member 10 so that the second contact element 3 is electrically connected to the third contact element 9, thereby closing the first switch. When the first contact element 2 is electrically coupled to the third contact element 9 upon winding of the film thereby closing the second switch, the first and second contact elements 2 and 3 are electrically coupled to each other so that the circuit of the exposure meter power source is closed, thereby activating the exposure meter while the lens is simultaneously set to a predetermined aperture or stop, whereby the exposure factors are adjusted.

When upon release of the shutter button the reflecting mirror is retracted from the optical path and the member 15 and the lever 12 are returned to their initial positions under the force of the spring 14 so as to return the mirror to its normal position, the pin 13 is disengaged from the first contact element 2 so that the first and third contact elements 2 and 9 are electrically disconnected, thereby opening the second switch. Thus, the exposure meter is deactivated. It should be noted that upon returning of the lever 12 to its normal position, its movement is somewhat controlled under the friction between the pin 13 and the first contact element 2 so that the impact of the reflecting mirror actuating member drivingly coupled to the lever 12 may be absorbed.

The present invention has been so far described as being applied to a single-lens reflex camera of exposure setting at stopping down type, but it will be understood that the present invention may be applied also to a single-lens reflex camera of exposure setting at maximum aperture type and other cameras.

I claim:
1. An exposure meter switch for cameras comprising:
   a first switch which is opened or closed in response to the actuation of a selection member for selecting an automatic exposure setting and a manual exposure setting and
   a second switch which is closed in response to the film winding and is automatically opened in response to the shutter release operation,
   both of said first and second switches being connected in series to a circuit of an exposure meter in such a manner that said exposure meter is activated only when both of said first and second switches are closed.
2. An exposure meter switch for cameras as specified in claim 1 wherein said first switch comprises a sliding member fixed to a movable insulating element movable in accordance with displacement of the selection member and a contact element pressed to said sliding member and said insulating element, said second switch comprises a contact element fixed to said sliding member and a contact element operable in accordance with shutter release operation.

References Cited
UNITED STATES PATENTS 3,367,251 2/1968 Furuta _____ 95—10C
3,406,619 10/1968 Rentschler _____ 95—10C JOSEPH F. PETERS, Jr., Primary Examiner U.S. Cl. X.R.

95—11R, 31R